United States Patent Office 3,515,280
Patented June 2, 1970

3,515,280
STACKED ELEMENT FILTER APPARATUS
Watson H. Parker, 1833 Benwick Road, E.,
Toledo, Ohio 43613
Filed Dec. 3, 1968, Ser. No. 780,677
Int. Cl. B01d 25/26
U.S. Cl. 210—314                                              7 Claims

ABSTRACT OF THE DISCLOSURE

A self-contained filter apparatus features a plural chambered tank, a side mounted pump and motor, adapted to deliver fluid to the lower chamber and thence to the upper discharge chamber; the lower chamber having therein a plurality of vertically stacked plate filters providing, in aggregate, a large surface area of filtration through which liquid must pass to reach said upper chamber; said apparatus including means for easy dismantling and replacement of any given plate filter.

---

The present invention relates generally to a filter apparatus and, more specifically, a self-contained unit for filtering oil used in the lubrication in a variety of industrial equipment and applications.

Conventionally, heavy, metal-working equipment such as lathes, grinders, planers, joiners, etc., feature an internal lubricant system which circulates therethrough for purposes of lubricating the heavy gears within the overall housing; which gears are ultimately used for transmitting power from a power source to the working tool.

The oil is circulated by suitable means (such as a pump or splash arrangement) to the uppermost regions of the unit and allowed to flow by gravity down over the contacting surfaces of the heavy gears. The oil ultimately collects in a sump located near the bottom regions of the unit from which it is recirculated back to the top. The sump, usually too frequently, becomes clogged with dirt, metal filings, etc. In some cases, a filter is installed near the sump inside the housing and in line with the conduit which is used to transport the liquid lubricant back to the top of the heavy gear trains. Even with this type of filtration, however, an accumulation of dirt and sludge is built up in the sump, necessitating shutdown of the machinery, dismantling of access plates and physical removal of the buildup of sludge, "gunk" and the like. Failure to so do results in accelerated wear and ultimate breakdown of the machinery.

Similarly, the hydraulic oil used in hydraulic cylinder actuation of drilling heads, tables and milling heads becomes dirty and contaminated, requiring shutdown for replacement of the oil, etc.

It is an object of the present invention to provide a self-contained exterior filtering apparatus which has utility in removing the oil from the above-enumerated types of metal-working equnipment, filter the oil through a self-contained battery of internal filters and return the oil to the equipment cleaned; that is, with the dirt, metal filings, "gunk," etc., removed.

It is a particular object of the present invention to provide such an apparatus which is particularly utilitarian in that filtration and/or cleaning of the oil being used as the lubricating oil in the particular industrial equipment is taking place while the equipment is being used, thereby avoiding shutdown of the equipment.

It is additionally an object of the present invention to provide a self-contained filtration unit which is of utility in cleaning the lubricating oil in railroad powerplants; e.g., steam, diesel, power units, etc.

It is still another object of the present invention to provide such an apparatus which is self-cleaning and avoids the use of internal filters for the equipment as was heretofore necessary.

It is yet another object of the present invention to provide an apparatus as described which enables the operation of equipment over a much longer period of time than was possible heretofore.

It is a significant object of the present invention to provide a filter apparatus which is of particular utility in lubricating or in filtering the lubrication oil employed in railroad powerplant equipment, permitting the utilization of the same oil for a considerably longer period of time, whereby the equipment does not have to be shut down for drainage of oil and introduction of new oil.

The foregoing, as well as other objects of the present invention, will become apparent from the following dedailed description taken in conjunction with the annexed sheets of drawings on which is pictured, for purposes of illustration only, a principal embodiment of the present invention.

In the drawings:

FIG. 1A is a schematic view of an interior wall of the filter apparatus;

In its simplest embodiment, the present invention envisions a tank composed of a plurality of chambers in at least one of which is contained in a battery of plate-like filters which are self-cleaning and, in a preferred embodiment, inclusive of a second stage of filtration in the same overall unit; said tank apparatus further including, mounted thereon, a pump, motor and connecting capabilities with conduit for use in connecting with the equipment containing the lubricating or hydraulic oil to be filtered.

Figure 1:
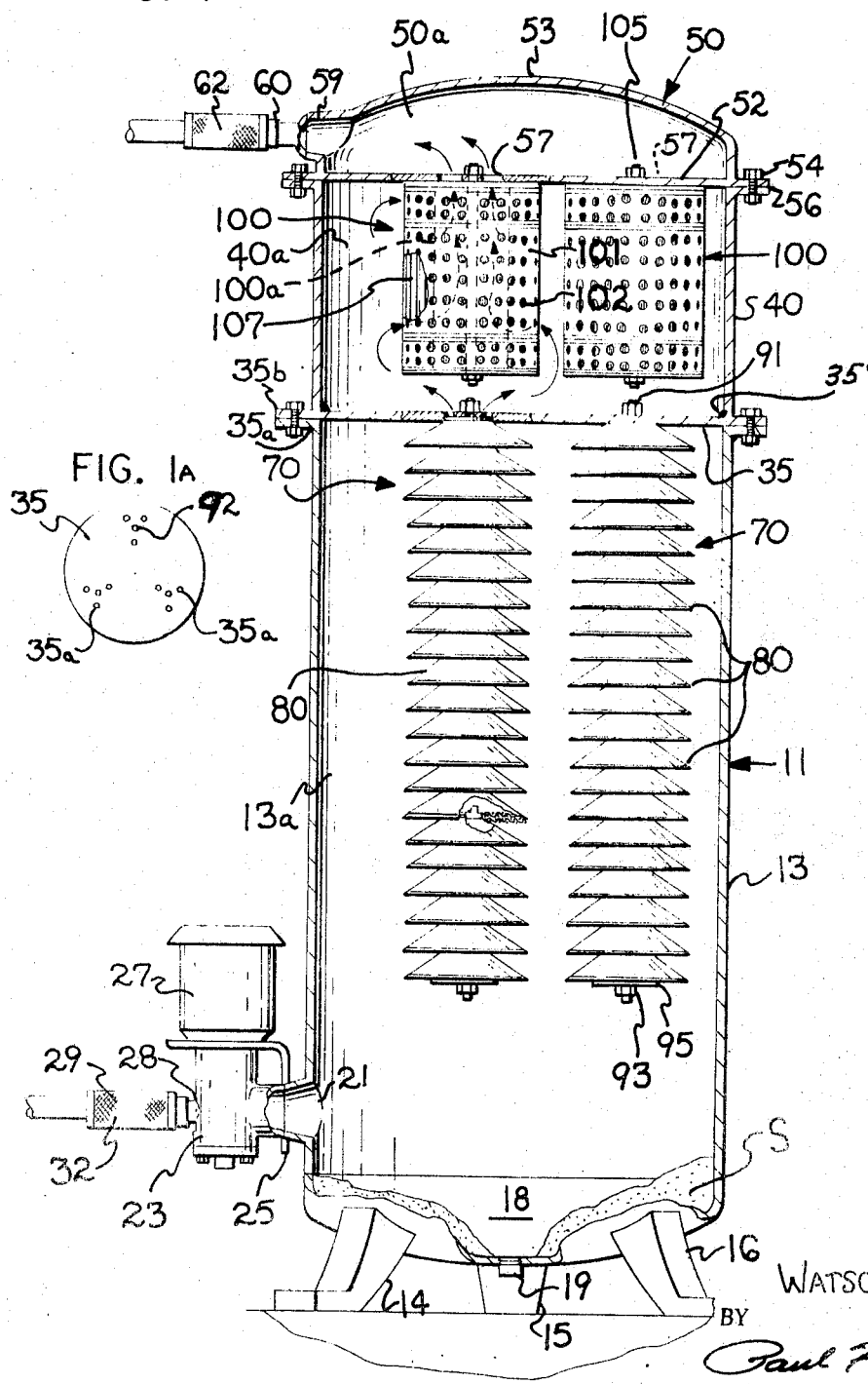
FIG. 1 is a side elevation view with parts broken away of a filter apparatus in accordance with a preferred embodiment of the present invention.

In the drawings, there is shown in FIG. 1 the overall apparatus identified by the reference numeral 11. The apparatus includes a vertically upstanding hollow tank member 13 suitably supported on upstanding support legs 14, 15, and 16. The bottom wall 18 of the tank contains a drain plug 19. The tank 13 includes a lower inlet 21 which is connected fluidly to a pump 23 suitably mounted on support structure 25 connecting with the exterior of the tank and which is suitably connected to a motor 27 situated thereabove. The inlet 28 of the pump connects with a flexible connector 29, terminating in a quick disconnect fastening 32.

A circular plate 35 is welded as at 35c to the lower edge or end of the cylinder 40. The plate 35 contains three spaced sets of apertures 35d (see FIG. 1A). The cylinder 40 is bolted to the matching flange welded as at the upper edge 35a of plate 13, which flange extends radially outwardly; appropriate gaskets being used (not shown) in the interest of insuring a fluid-tight connection. With the flanges in flush registry as at 35b and bolted as shown, the plate 35 and tank 13 define an interior chamber 13a which communicates via the apertures 35d with chamber 40a thereabove within the cylinder 40.

Reference numeral 50 identifies a hollow domed cap member which includes a generally circular bottom plate 52 integrally secured to the dome portion 53 and being secured by suitable nuts and bolts 54 via flange connection 56 to the flanged upper end of the cylinder 40. The wall 52 contains three spaced holes or apertures 57 disposed generally like the apertures 35d in plate 35, although only two of which are shown in FIG. 1. An outlet pipe 59 is welded to the dome 53 in the left-hand region, as shown, and this latter outlet threadingly connects at 60 to the quick disconnect arrangement identified as 62, which is similar to the one 32 near the bottom. The domed cap member 50 defines a third upper chamber 50a above the chamber 40a and in fluid communication therewith via the spaced holes 57.

Figure 2:
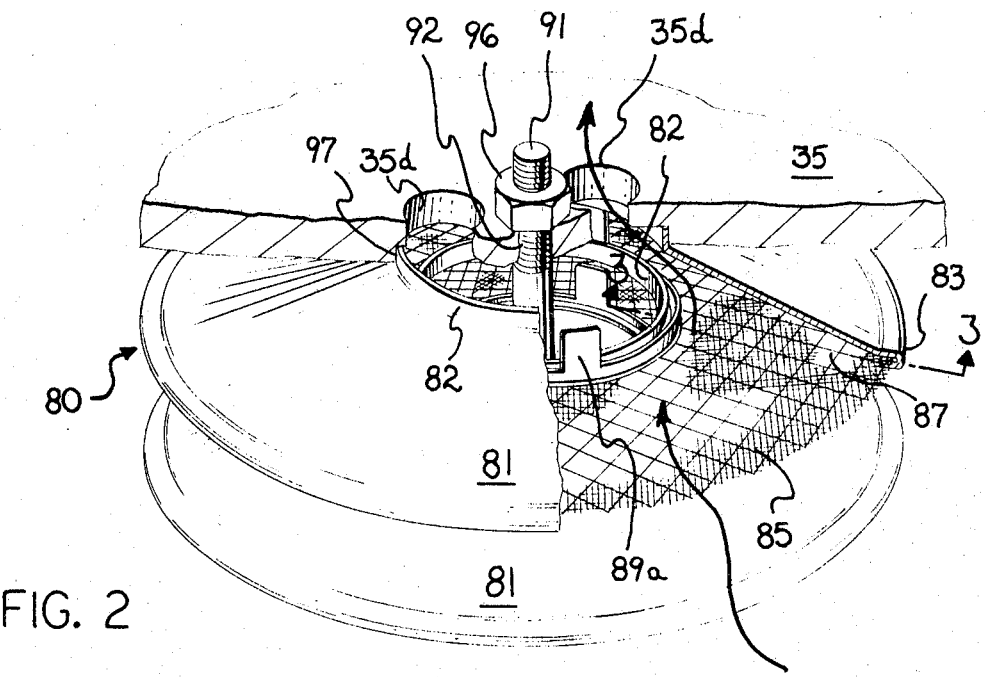
FIG. 2 is a perspective view with portions broken away of a part of the interior filter construction shown greatly enlarged in order to lend clarity.
Figure 3:
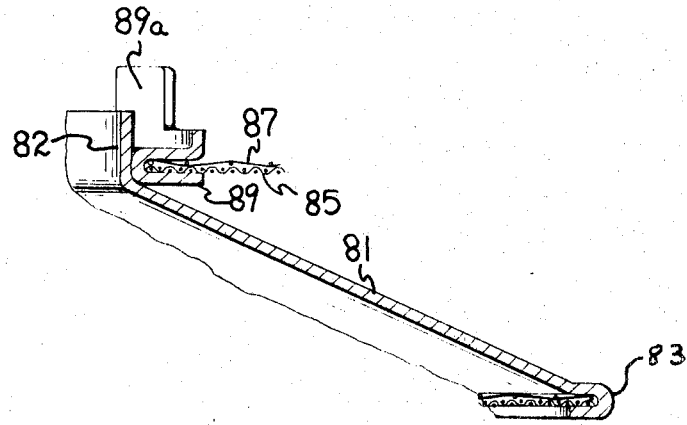
FIG. 3 is a view similar to FIG. 2 showing an interfittings of several identical components of the present invention.

In accordance with the present invention, a first stage of filtration is provided by three vertical stacks of individual leaf or plate filters; the three stacks being identified by the reference numeral 70. Only two of the stacks are shown in FIG. 1 due to it being, in part, a sectional view. The stacks 70 are composed of a plurality of leaf, plate or disk-like filter elements identified by the reference numeral 80. The leaf-type filters include a principal body member 81 of generally frusto conical configuration including an inner upstanding collar or neck 82, a connected downwardly diverging annular plate and an outer crimped periphery 83. Clamped in the peripheral edge 83 of the metal plate is a lowermost, annular, fine-mesh screen member 85 and thereabove, in abutting relationship, a similar annular support webbing member 87 of not as fine a mesh. The fine-mesh screen of annular configuration and the metallic support webbing 87 thereabove, as indicated, are in mutually flush relationship and their inner peripheries are clamped in an inner ring member 89 which is generally concentric with collar 82, situated below the collar and having a slightly larger I.D. whereby the collar 82 may fit snugly into the ring 89 of the plate or disk filter 80 thereabove. The central crimp ring 89 includes three upstanding projections 89a in equally spaced location about the ring, only two being shown. The upstanding leg 89a on the inner crimp ring 89 of leaf or disk filter 80 serves as a spacer, preventing collapse of the filtering and support members 85 and 87 against the sloping metal shield 81. An elongated bolt 91 threaded at each end, as shown, extends down through one of three holes 92 in plate 35 and through the succession of annular collars 82 and rings 89 to the bottommost leaf filter in the stack 70 where a nut 93 and plate or gasket 95 hold the bottommost filter of the stack and tightening of the nut 93 cinches the array of plate or leaf filters together with the collar, e.g., neck, portion 82 of each snug into the ring member 89 of the leaf filter 80 thereabove. The uppermost leaf filter 80 has its collar 82 recessed into an appropriate cut 97 on the underside of plate 35. It is a feature of the apparatus of the present invention that the plate filters are easily reached for replacement of a given plate by releasing the flanged connection, as at 35b, by removing the nuts and bolts shown. Then the cylinder 40 and cap 50 are lifted up as a single unit including plate 35. Since the three stacks 70 of plate filters 80 are bolted to the underside of plate 35, they will move out of the tank 13 so that any given stack can be disassembled by removing nut 93. One or all of the plate filters can then be removed and replacements added onto the elongated bolt and the nut 93 and gasket 95 replaced and tightened. Then the entire subassembly formed of cylinder 40 and cap 50 can be lowered registeringly in the tank 13 to the position shown, followed by tightening of the flange connection at 35b. The gasket 95, of course, prevents liquid flow through the ring member 89 of the lowermost plate filter whereby all liquid must pass through the screen region, as indicated by arrows in FIG. 2.

Within the chamber 40a and secured to the underside of wall 52 in fluid communication with the holes or apertures 57, there is sealingly connected a plurality (three shown) of canister members 100. The canisters each include an inner cylinder 100a; the outer cylindrical wall 101 of the canister and the wall of the inner cylinder containing a large plurality of perforations 102. The canisters are secured to the underside of wall 52 in the same manner as the stack of leaf filters 80. Thus, see the nut and bolt arrangement generally identified by the reference numeral 105. The bottom of the canister is suitably sealed and the upper end has an appropriate communicating passageway with the holes or apertures 57 in the upper wall. The canisters contain, interiorly thereof, a fluted paper filter 107 which spans the space between the inner cylinder and the outer wall of the canister.

In operation of the unit and utilizing the quick disconnect/connect arrangement 32, the inlet is connected to a flexible conduit which extends to the metal-working equipment or railroad power plant containing the oil to be cleaned. The motor is started and the self-priming pump 23 sucks oil from the reservoir concerned and directs it through the opening 21 into the interior of the lower chamber 13a. The chamber 13a gradually fills, whereupon the positive displacement pump introducing more fluid increases the pressure within the tank, urging the fluid to flow into the upper chamber 40a. The only path the oil can take is through the three stacks of filters 70. The flow of oil to be filtered is upwards first through the fine-mesh screen component 85 of the individual leaf filters 80 in the manner indicated by the arrows in FIG. 2, thence through the larger mesh of the support member 87, laterally between the spaced ring 89 and the collar 82 thereabove to near the threaded bolt 92. The vertical succession of collar and ring connections, in effect, define an elongate passageway extending upwardly and communicating with the perforations 35d in plate 35. When chamber 13a is filled and oil flow continued, the oil overflows into chamber 40a. Because of the construction of canisters 100 as described above, the oil, after finally filling chamber 40a, can only overflow into upper chamber 50a by passing through perforations 102, thence through the fluted filter paper to the interior of the inner canisters 100a and thence up through the apertures 57 in plate 52 into chamber 50a defined by the domed cover member 50. It will be appreciated that once the entire unit, including chambers 13a, 40a and 50a, is full of oil, continued introduction of oil will cause the clean oil in chamber 50a to flow out the outlet 59 through the quick connect-disconnect coupling 62 to an appropriate conduit, returning the oil to the industrial metal-working equipment being serviced.

Usually, the unit is operated for a sufficient period of time that casual inspection of the oil being returned to metal-working equipment is cleaned.

It is a feature of the present invention that the sloped imperforate frustoconical upper wall 81 of the individual leaf or plate-like filters 80 and the perforate support 87 protect the fine-mesh screen 85 from damage. The annular metal plate 81 creates a shield from falling debris which may be released from the underside of the screen element thereabove upon cessation of a given filtering operation. This debris falling from the underside of the screens in the vertical stacked array simply falls down upon the cessation of pressure, hits the inclined annular wall 81 and falls to the outside and down to the bottom of the tank proximate the support legs 14, 15 and 16 where sludge is identified by the reference letter S.

It is another feature of the present invention that, in operation, any entrained particle which might damage the fine-mesh delicate screen 85 is prevented from doing so by reason of the protection afforded by the somewhat larger mesh and somewhat stronger screen element 87 lying above the screen in abutting supporting relationship; the two being mutually clamped or crimped at their outer and inner peripheries, lending integrity thereto.

It is still another feature of the present invention that the large number of filter elements present, in aggregate, a large area of screen filtration. As a consequence, the actual pressure within the unit is quite low, e.g., in the neighborhood of not more than 45 p.s.i. With three stacks of plate filters including forty or more plates in each stack, a filtering area of up to 2000 square inches is available.

The disconnect inlet and outlet, respectively 32 and 62, permit the apparatus to be backflushed conveniently for cleaning of any fine debris which may tend to accumulate on the underside of the fine-mesh screen 85. All that is necessary is to reverse the flow in the unit by a suitable connection or employment of a reversible motor 27 and the oil inside is pumped out. As a matter of fact, simply opening the inlet and outlet will permit gravity to remove oil from the normally filled tank. The bottommost outlet 19 allows any accumulated sludge to be removed periodically as the particular service conditions may require.

If damage should be done to any of the individual leaf filters and particularly to the fine-mesh screen component 85, it will be appreciated that the cylinder 40 may be removed from the tank 13 by dismantling of the flanged nut and bolt connection 35b, whereupon the upper subassembly may be lifted up, including plate 35 and the connected stacks 70 as described earlier herein. The individual leaf filters 80 are, as indicated, held together by the nut 93 and elongated bolt 91. Any one of them can be easily removed and replaced by a replacement unit.

In a similar manner, the canisters 100 can be removed and replaced periodically by simply removing the domed cover 50 and disconnecting the individual canisters desired to be replaced via the nut and bolt arrangement 105.

Generally, with the arrangement as described, the tank itself need only operate under a pressure of 45 pounds per square inch or less since it is under constant recirculation and does not require exorbitant pressures in order to accomplish filtrations.

It will further be appreciated that with this quick disconnect feature a backflushing with an appropriate solvent may be employed; the lower inlet being directed to a waste disposal facility. The filter apparatus as described herein has proven eminently long lived under service conditions, albeit that the overall apparatus is of quite simplified construction and therefore quite economical.

Generally, the tank components described may be fabricated of a medium grade of iron or steel although, under certain conditions and in certain applications, more exotic materials of construction may be employed as, for example, a galvanized metal or, in an extreme case, stainless steel. The motor and pump 23 and 27, respectively, are generally "off the shelf" items and need not be described in detail. It is a feature of the present invention that they are mounted on the tank 11 as to provide an essentially and substantially completely self-contained unit which may be transported if need be from place to place throughout an industrial facility for use as needed or it may be transported by appropriate dolly or Towmotor truck from machine to machine in a given bank of machines at a given industrial facility.

Modifications may be resorted to without departing from the spirit and scope of the present invention as defined in the appended claims.

I claim:
1. A filter apparatus comprising:
   (1) an upstanding tank having a lower inlet and an upper outlet,
   (2) a transverse wall dividing said tank into an upper chamber containing the upper outlet and a lower chamber containing the lower inlet, said transverse wall having at least one hole or opening connecting said upper and lower chambers,
   (3) a plurality of vertically stacked plate filters depending from the underside of said transverse wall into said lower chamber, said plate filters each including (a) an annular plate having an inner periphery defining a neck surrounded aperture and an outer periphery, (b) a ring member disposed below in spaced concentric relationship with said neck and (c) an annular filter screen connecting the ring and the outer periphery of said plate, said neck and ring of vertically adjacent filters being snugly but releasably engaged and the neck of the uppermost filter of said stack embracing said opening or hole in said wall means, said plurality of vertically stacked plate filters in assemblement defining an elongate central passageway connecting at its upper end with said opening or hole and having a plurality of vertically spaced openings spanned by said screen elements, and
   (4) driven pump means mounted on said tank proximate said inlet and connected therewith for pumping liquid to be filtered through said lower inlet, filling said lower chamber including said plate filters, and thence into said upper chamber, all liquid so moving passing through said annular filter screens, thence to said central passageway and through said opening or hole.

2. A filter apparatus as claimed in claim 1, which includes a bolt means extending axially through said elongate central passageway from above said annular plate to below the lowermost of said plate filters,
   means releasably securing said bolt means to the upper side of said annular plate,
   means releasably and adjustably securing said bolt means to the underside of the ring of the lowermost plate filter and
   gasket means between said last-mentioned means and the ring member of said lowermost plate filter.

3. A filter apparatus as claimed in claim 1, in which each plate filter includes an annular perforate support member secured to said ring member and said annular plate and located in surface abutment on the upper side of said annular filter screen to support and protect said filter screen against damage by particles carried by liquid being filtered and impinging on said filter screen in the flow of liquid upwardly in said tank as urged by said pump means.

4. A filter apparatus as claimed in claim 1, which includes means for holding said plurality of vertically stacked filters in stacked flush array, said means extending from above said wall means down to below said bottommost filter.

5. A filter apparatus as claimed in claim 1, which includes a second wall means below said outlet defining a second chamber between said lower chamber containing the inlet and upper chamber containing the outlet, said second wall means including at least one aperture connecting said lower chamber and said second chamber, and a canister member depending from said second wall means, said canister including a principal perforate outer shell, an upper outlet embracing said aperture in said second wall means and an interior filter means constructed and arranged within said shell so that fluid in said second chamber must pass through said filter means to move through said aperture in said second wall means into said upper chamber and out said upper outlet.

6. A filter apparatus as claimed in claim 1, wherein said upper chamber portion of said tank and said plate are secured together and are separable from said portion of said tank defining the lower chamber.

7. A filter apparatus as claimed in claim 6, wherein said annular plate extends from its neck to its outer periphery in a downwardly inclined path.

References Cited
UNITED STATES PATENTS

| | | | |
|---|---|---|---|
| 1,906,417 | 5/1933 | Renfrew et al. | 210—344 X |
| 1,932,117 | 10/1933 | O'Brien et al. | 210—344 X |

REUBEN FRIEDMAN, Primary Examiner

F. A. SPEAR, Jr., Assistant Examiner

U.S. Cl. X.R.

210—344, 416